US011761600B2

(12) United States Patent
Wu et al.

(10) Patent No.: US 11,761,600 B2
(45) Date of Patent: Sep. 19, 2023

(54) LIGHT-GUIDING COMPONENT, LIGHTING DEVICE, AND VEHICLE (71) Applicant: VALEO VISION, Bobigny (FR)

(72) Inventors: Sihua Wu, Wuhan (CN); Bing Zhang, Wuhan (CN)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 17/758,336

(22) PCT Filed: Dec. 29, 2020

(86) PCT No.: PCT/CN2020/140669
§ 371 (c)(1),
(2) Date: Jul. 1, 2022

(87) PCT Pub. No.: WO2021/136235
PCT Pub. Date: Jul. 8, 2021

(65) Prior Publication Data
US 2023/0043865 A1 Feb. 9, 2023

(30) Foreign Application Priority Data
Jan. 2, 2020 (CN) .......................... 202020006681.3

(51) Int. Cl.
F21S 41/24 (2018.01)
F21S 43/249 (2018.01)
(Continued)

(52) U.S. Cl.
CPC ............. F21S 41/24 (2018.01); F21S 41/322 (2018.01); F21S 43/243 (2018.01);
(Continued)

(58) Field of Classification Search
CPC ...... F21S 43/249; F21S 41/322; F21S 43/243; F21S 43/241; F21V 7/06; F02B 27/30
See application file for complete search history.

(56) References Cited

U.S. PATENT DOCUMENTS 10,082,272 B2 9/2018 Gromfeld
10,690,309 B2 6/2020 Gromfeld
(Continued)

FOREIGN PATENT DOCUMENTS

CN 108302457 A 7/2018
CN 108474534 A 8/2018
(Continued)

OTHER PUBLICATIONS

International Search Report dated Mar. 31, 2021, in PCT/CN2020/140669 filed on Dec. 29, 2020 (2 pages).

Primary Examiner — Laura K Tso
(74) Attorney, Agent, or Firm — Oblon, McClelland, Maier & Neustadt, L.L.P.

(57) ABSTRACT

A light-guiding component includes a light introduction section, the light introduction section including a first light incidence portion and a second light incidence portion that face different directions. The first light incidence portion is capable of receiving incident light from a light source that corresponds to the first light incidence portion, and the second light incidence portion is capable of receiving incident light from a light source that corresponds to the second light incidence portion. A light-guiding section provided with a light exit surface and configured to guide the light from the first light incidence portion or the second light incidence portion to be propagated therein and then exit from the light exit surface.

19 Claims, 9 Drawing Sheets (51) Int. Cl.
*F21S 41/32* (2018.01)
*F21S 43/243* (2018.01)
*F21V 7/06* (2006.01)
*G02B 27/30* (2006.01)
*F21S 43/241* (2018.01)

(52) U.S. Cl.
CPC .............. *F21S 43/249* (2018.01); *F21V 7/06* (2013.01); *F21S 43/241* (2018.01); *G02B 27/30* (2013.01)

(56) References Cited

U.S. PATENT DOCUMENTS

| | | | |
|---|---|---|---|
| 11,274,802 B2 * | 3/2022 | Dressier | F21S 41/43 |
| 2018/0356073 A1 | 12/2018 | Gromfeld | |
| 2020/0256540 A1 * | 8/2020 | Risthaus | F21S 43/241 |

FOREIGN PATENT DOCUMENTS

| | | |
|---|---|---|
| CN | 210740266 U | 6/2020 |
| CN | 212584877 U | 2/2021 |

* cited by examiner

LIGHT-GUIDING COMPONENT, LIGHTING DEVICE, AND VEHICLE

TECHNICAL FIELD

The present disclosure relates to the field of lighting and/or signal indicating, and more specifically, to a light-guiding component, a lighting device, and a vehicle.

BACKGROUND ART

A lighting device is an indispensable component of various lighting devices and/or optical signals indicating devices. It is used to provide light for illumination and/or optical indication, widely applicable in many fields, for example the use of car lights or other lighting devices in motor vehicles to ensure safe driving. In motor vehicles, various types of car lights are often needed to achieve different functions, including car headlights, fog lights, tail lights, indicator lights, brake lights, and parking lights.

In existing motor vehicles, a single light-emitting device can usually achieve only one function. Therefore, in order to meet the requirements imposed by road regulations on lighting and/or signals indicating functions, styling requirements, etc., it is necessary to configure various light-emitting devices or light-guiding structures for motor vehicles. Consequently, light-emitting devices or light-guiding structures occupy large spaces.

SUMMARY OF THE INVENTION

An objective of the present disclosure is to overcome at least one of the above-described and other problems as well as shortcomings in the prior art.

According to an aspect of the present disclosure, embodiments provide a light-guiding component, comprising: a light introduction section, the light introduction section comprising a first light incidence portion and a second light incidence portion that face different directions, the first light incidence portion being capable of receiving incident light from a light source that corresponds to the first light incidence portion, the second light incidence portion being capable of receiving incident light from a light source that corresponds to the second light incidence portion; and a light-guiding section, the light-guiding section being provided with a light exit surface and configured to guide the light from the first light incidence portion or the second light incidence portion to be propagated therein and then exit from the light exit surface.

In some embodiments, the first light incidence portion and the second light incidence portion are configured to receive light that enters in different directions, and an included angle between an optical axis of the first light incidence portion and an optical axis of the second light incidence portion is within a range of being greater than 0 degrees and smaller than or equal to 180 degrees.

In some embodiments, the first light incidence portion comprises a plurality of first light incidence units, the second light incidence portion comprises a plurality of second light incidence units, the plurality of first light incidence units and the plurality of second light incidence units are respectively arranged along a width direction of the light-guiding component, and the first light incidence portion and the second light incidence portion are not collinear in the width direction.

In some embodiments, at least one of the first light incidence unit and the second light incidence unit comprises a collimator to collimate received light into parallel light.

In some embodiments, the light-guiding component is configured such that the light exit areas respectively corresponding to the first light incidence portion and the second light incidence portion at the light exit surface at least partially overlap in the width direction of the light-guiding component.

In some embodiments, the light-guiding component further comprises a transition section, the transition section being located between the light introduction section and the light-guiding section and configured to guide light that has entered from the first light incidence portion and the second light incidence portion towards the interior of the light-guiding section, so that light from the first light incidence portion exits from a first light exit area of the light exit surface after being guided by the transition section, and light from the second light incidence portion exits from a second light exit area of the light exit surface after being guided by the transition section, the first light exit area and the second light exit area at least partially overlapping in the width direction.

In some embodiments, the transition section guides part of the incident light from at least one of the first light incidence portion and the second light incidence portion to change its direction.

In some embodiments, the transition section comprises: a first reflection surface positioned adjacent to a corresponding light incidence portion to reflect incident light entering from the light incidence portion; a second reflection surface for receiving and reflecting a part of the light reflected by the first reflection surface; and a third reflection surface for receiving reflected light from the second reflection surface and then reflecting it into the light-guiding section, so that the reflected light is propagated in the light-guiding section to exit from the light exit surface.

In some embodiments, the first reflection surface is oriented to reflect a part of incident light from a corresponding light incidence portion to the second reflection surface, and reflect another part of the incident light directly into the light-guiding section so that it exits from the light exit surface.

In some embodiments, at least one of the second reflection surface and the third reflection surface comprises a parabolic surface or a conical surface.

In some embodiments, the second reflection surface and the third reflection surface are both parabolic surfaces, and the two parabolic surfaces have the same focus.

In some embodiments, the second reflection surface and the third reflection surface are located on opposite sides of the transition section.

In some embodiments, at least one of the second reflection surface and the third reflection surface is provided with a light dispersion structure, so that light dispersed by the light dispersion structure exits across the thickness of the light-guiding component at the light exit surface.

In some embodiments, the transition section comprises a fourth reflection surface positioned adjacent to a corresponding light incidence portion to directly reflect incident light entering from the light incidence portion into the light-guiding section so that it exits from the light exit surface.

In some embodiments, the light exit surface is provided with a plurality of scattering structures, the plurality of scattering structures being configured to uniformly scatter outwards the light that has exited from the light-guiding section.

According to another aspect of the present disclosure, embodiments provide a lighting device, comprising: at least two groups of light sources, and the light-guiding component as described in any embodiment of the present disclosure, wherein one group of light sources corresponds to the first light incidence portion, and the other group of light sources corresponds to the second light incidence portion.

In some embodiments, the colour of light emitted by the one group of light sources and that by the other group of light sources are different.

According to yet another aspect of the present disclosure, embodiments provide a vehicle, comprising the light-guiding component or the lighting device as described in any embodiment of the present disclosure.

A detailed description of the present disclosure below with reference to the attached drawings will make other objectives and advantages of the present disclosure apparent and help achieve a comprehensive understanding of the present disclosure.

BRIEF DESCRIPTION OF THE DRAWINGS

These and/or other aspects and advantages of the present disclosure will become apparent and easy to understand from the following description of the illustrative embodiments in conjunction with the attached drawings, in which.

SPECIFIC EMBODIMENTS

Embodiments of the present disclosure will be described in detail below in conjunction with the attached drawings. In this description, the same or similar components are indicated by the same or similar reference numerals.

In addition, in the following detailed description, for ease of explanation, many specific details are given to provide a comprehensive understanding of the embodiments of the present disclosure. However, it is obvious that one or more embodiments could also be implemented without these specific details. In other cases, well-known structures and devices are shown in the form of illustrations to simplify the drawings.

FIGS. 1 to 4B schematically show the structure of a light-guiding component according to an exemplary embodiment of the present invention. As shown in the figures, the light-guiding component 100 comprises a light introduction section 110 and a light-guiding section 120. The light introduction section 110 at least comprises a first light incidence portion 111 and a second light incidence portion 112 that are oriented in different directions, each light incidence portion being used for receiving incident light from a corresponding light source 101 or 102. In other words, the first light incidence portion 111 and the second light incidence portion 112 respectively face the light sources 101 and 102 located in different orientations with respect to the light-guiding component 100, and are oriented to receive light entering the light-guiding component 100 from the corresponding light source 101 or 102 in different directions. The light-guiding section 120 is provided with a light exit surface 121, and the light entering the light-guiding component 100 from the first light incidence portion 111 or the second light incidence portion 112 is guided by the light-guiding section 120 to be propagated therein and finally exit the light exit surface 121. Preferably, as shown in FIG. 3B, the light exit surface 121 is provided with a plurality of scattering structures 124, such as dome-shaped or pillow-shaped protrusions, which are configured to uniformly scatter outwards the light exiting from the light-guiding section 120.

Thus, by guiding, with the same light-guiding component, light from light sources located in different orientations or light entering in different directions, a variety of lighting/indicating functions may be fulfilled, and positions or orientations of light sources used for different lighting/indicating functions may be flexibly arranged as needed, without the need for arranging a separate light-guiding component for each light source or each lighting/indicating function; thus, a more compact lighting/indicating structure may be achieved.

Figure 1:
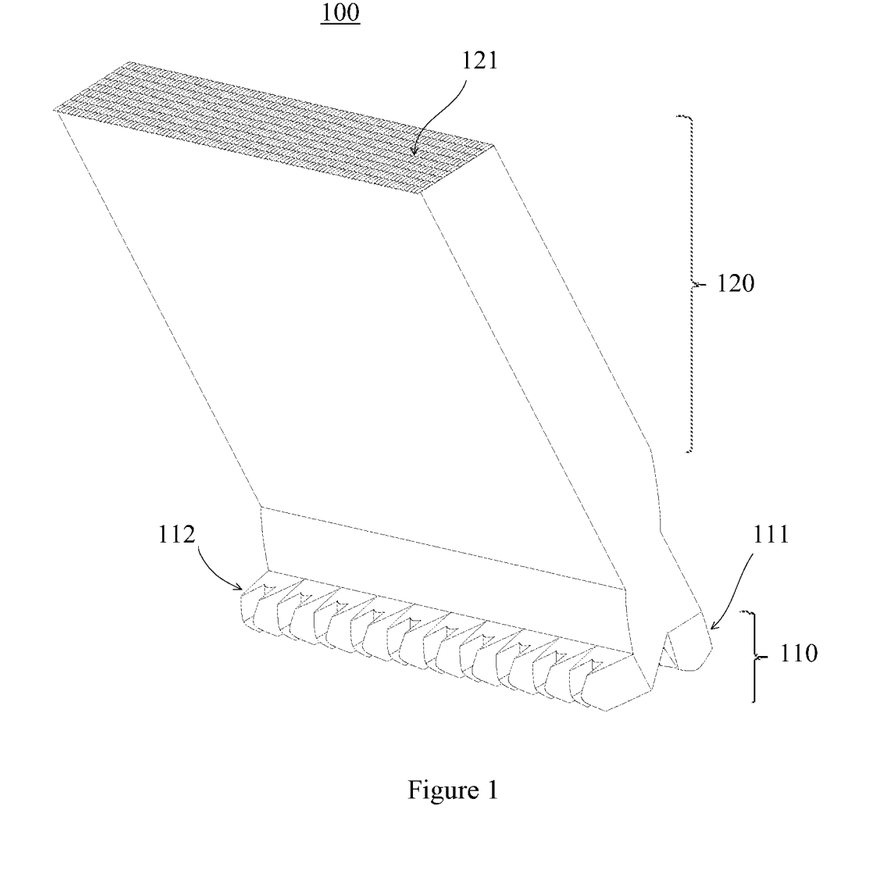
FIG. 1 is a lateral perspective view schematically showing the structure of a light-guiding component according to an embodiment of the present disclosure.
Figure 2:
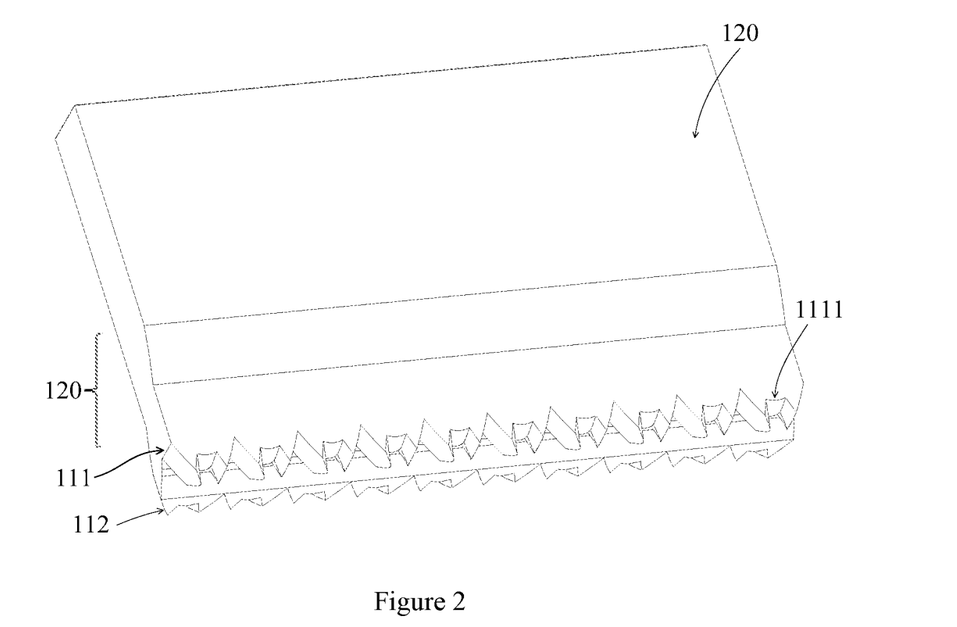
FIG. 2 is a bottom perspective view schematically showing the structure of a light-guiding component according to an embodiment of the present disclosure.
Figure 3A:
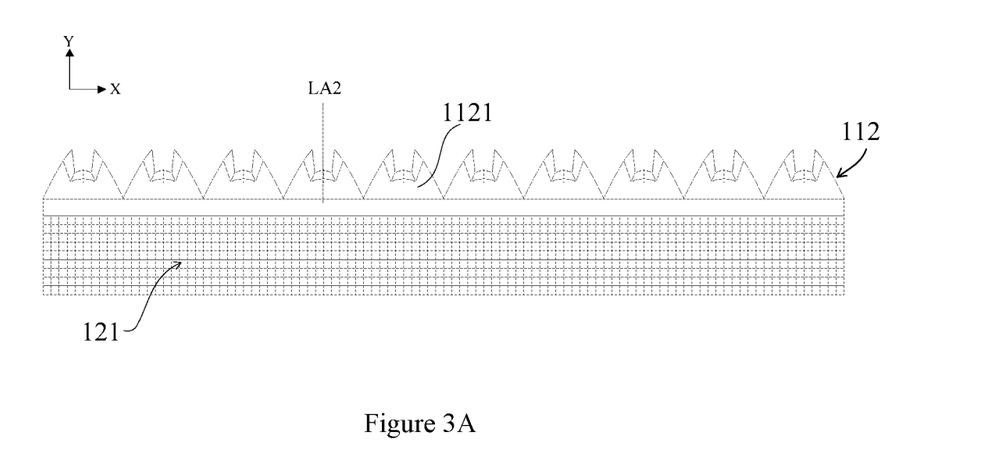
FIG. 3A is a top perspective view schematically showing the structure of a light-guiding component according to an embodiment of the present disclosure.
Figure 3B:
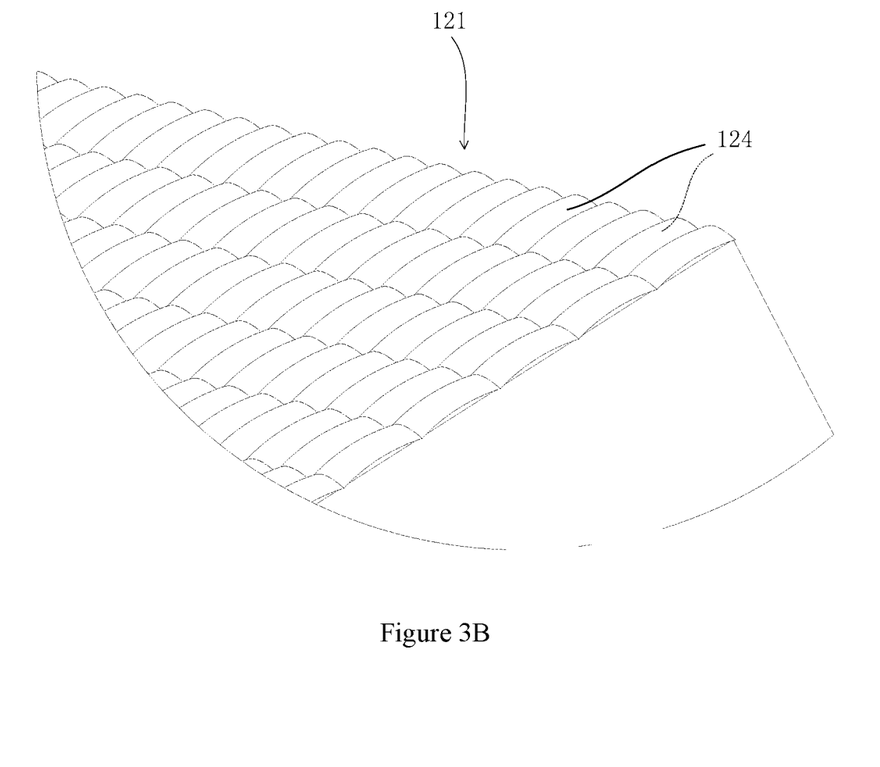
FIG. 3B is a partial enlarged view schematically showing the structure of a light exit surface of a light-guiding component according to an embodiment of the present disclosure.
Figure 4A:
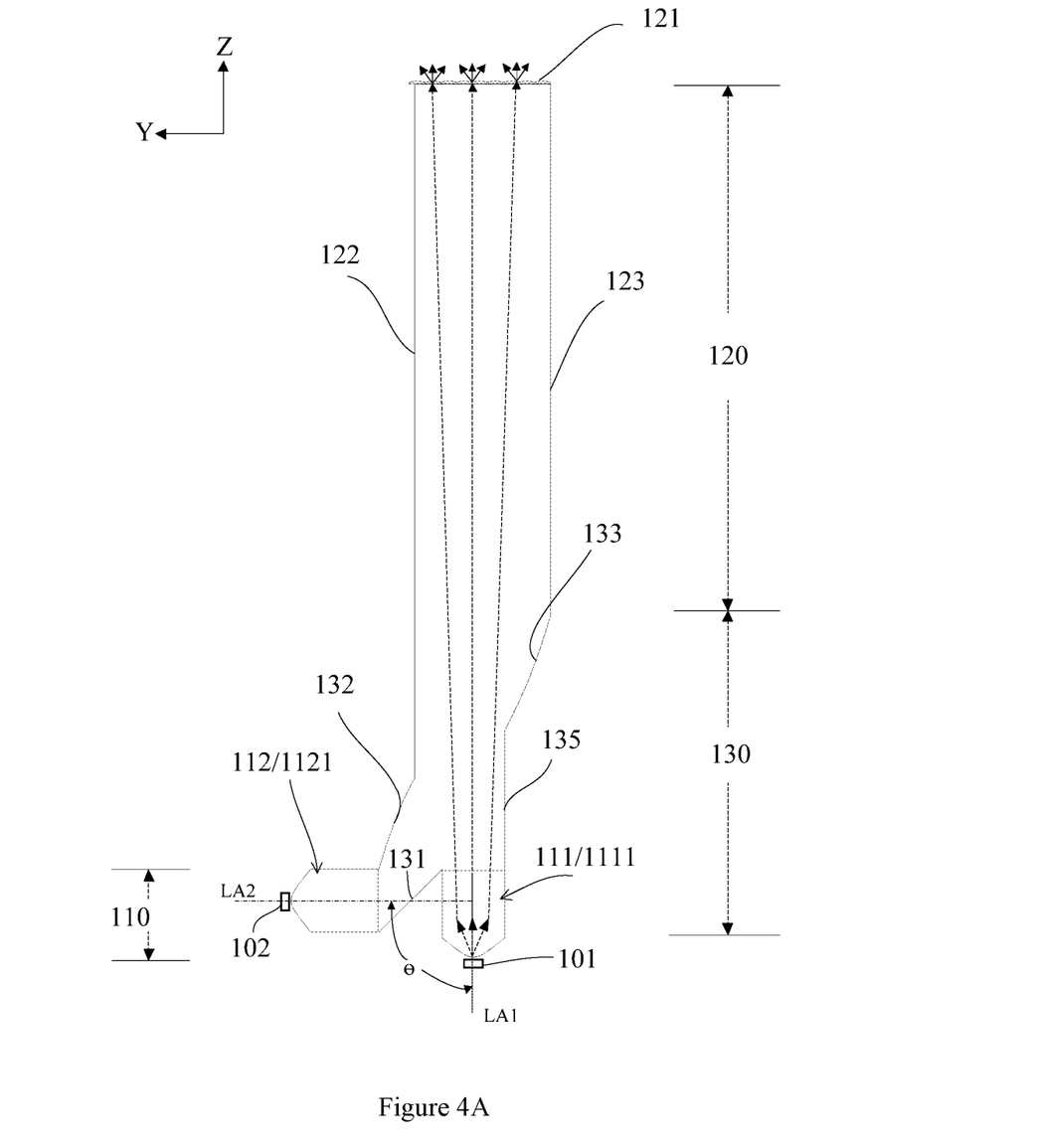
FIG. 4A is a cross-sectional view schematically showing the structure of a light-guiding component according to an embodiment of the present disclosure, in which a propagation path of light entering from the first light incidence portion in the light-guiding component is shown.

An orientation of the first light incidence portion 111 and that of the second light incidence portion 112 may be represented by their optical axes. As shown in FIGS. 3A and 4A, the first light incidence portion 111 is provided with an optical axis LA1, and the second light incidence portion 112 is provided with an optical axis LA2. For example, a direction of an optical axis may coincide with or be parallel to the central line of a light beam from a corresponding light source. According to an embodiment of the present disclosure, an included angle θ between the optical axis LA1 of the first light incidence portion 111 and the optical axis of the second light incidence portion 112 may be within a range of being greater than 0 degrees and smaller than or equal to 180 degrees; for example, the two optical axes form a roughly V-shaped contour. Exemplarily, the optical axis LA1 of the first light incidence portion 111 and the optical axis of the second light incidence portion 112 may be perpendicular to each other (as shown in FIGS. 1-4B) or point in opposite directions (as shown in FIGS. 5-7B).

Exemplarily, as shown in the figures, the light introduction section 110 and/or the light-guiding section 120 of the light-guiding component 100 may have a flat shape; as a whole, the light-guiding component 100 or its light-guiding section 120 has a width direction X and a thickness direction Y, the light-guiding section 120 integrally extending from the light introduction section and/or the transition area described later to the light exit surface along the Z direction. For example, the light-guiding section 120 is provided with two side surfaces 122 and 123 that are opposite in the thickness direction; the two side surfaces may be substantially parallel to each other and may be flat surfaces. However, the present disclosure is not limited thereto, and these sections may also have other shapes; for example, they may be slender light-guides or rod-shaped light-guides. In some examples, the first light incidence portion 111 and the second light incidence portion 112 are not collinear in the width direction X.

Depending on a light output profile of a corresponding light source, for example, a spot, linear, or planar light source, the first light incidence 111 and/or the second light incidence 112 may comprise one or more corresponding light incidence ports or light incidence units. In the illustrated embodiment, the first light incidence portion 111 comprises a plurality of first light incidence units 1111, and the second light incidence portion 112 comprises a plurality of second light incidence units 1121, each light incidence unit functioning as a light incidence port or being provided with a corresponding light incidence surface to receive incident light from a corresponding light source. The plurality of first light incidence units 1111 and/or the plurality of second light incidence units 1121 are arranged along the width direction X of the light-guiding component 100; for example, they are linearly arranged in the shape of a straight line or a curve as a whole; in other words, the plurality of first light incidence units 1111 are sequentially arranged in the width direction X; for example, they are arranged adjacent to each other along a first line in the width direction X, and/or the plurality of second light incidence units 1121 are sequentially arranged in the width direction X; for example, they are arranged adjacent to each other along a second line different from the first line in the width direction X, and the first line and/or the second line may be a straight line or a curve. It is understandable that the number of the first light incidence units 1111 and the number of the second light incidence units 1121 may be set on the basis of actual needs, and the two may be the same or different.

In some examples, the first light incidence unit 1111 or the second light incidence unit 1121 may comprise a collimator to collimate received light into substantially parallel light.

According to an embodiment of the present disclosure, the light-guiding component 100 is configured to guide the light entering from the first light incidence portion 111 and the second light incidence portion 112 such that the light exit areas respectively corresponding to the first light incidence portion 111 and the second light incidence portion 112 at the light-exit surface 121 overlap at least partially in the width direction X. In other words, an area in the light exit surface 121 for allowing exiting of light that has entered the light-guiding component 100 from the first light incidence portion 111 and an area therein for allowing exiting of light that has entered the light-guiding component 100 from the second light incidence portion 112 overlap at least partially in the width direction X, so that the dimensions, for example, the width, of the light-guiding component may be reduced. Exemplarily, an area in the light exit surface 121 for allowing exiting of light that has entered the light-guiding component 100 from a first light incidence unit 1111 and an area therein for allowing exiting of light that has entered the light-guiding component 100 from a corresponding second light incidence unit 1121 overlap at least partially in the width direction X.

In some embodiments, the first light incidence portion 111 and the second light incidence portion 112 are at least partially aligned with or overlap each other in the thickness direction Y. For example, a first light incidence unit 1111 and a corresponding second light incidence unit 1121 are arranged sequentially or adjacently in the thickness direction Y, for example, being at least partially aligned with or overlapping each other. For example, the optical axis of a first light incidence unit 1111 and that of a corresponding second light incidence unit 1121 are located in the same virtual plane perpendicular to the width direction X.

Light that has entered the light-guiding component 100 from the first light incidence portion 111 and/or the second light incidence portion 112 may exit within the entire range of the dimensions of the light exit surface 121 in the thickness direction Y, or exit within only a part of the range of the dimensions of the light exit surface 121 in the thickness direction Y. For example, an area in the light exit surface 121 for allowing exiting of light that has entered the light-guiding component 100 from the first light incidence portion 111 and an area therein for allowing exiting of light that has entered the light-guiding component 100 from the second light incidence portion 112 overlap at least partially in the thickness direction Y, so that the dimensions, for example, the thickness, of the light-guiding component may be further reduced. In another embodiment, an area in the light exit surface 121 for allowing exiting of light that has entered the light-guiding component 100 from the first light incidence portion 111 and an area therein for allowing exiting of light that has entered the light-guiding component 100 from the second light incidence portion 112 may not overlap each other in the thickness direction Y, thereby meeting different requirements on light exit. Exemplarily, an area in the light exit surface 121 for allowing exiting of light that has entered the light-guiding component 100 from a first light incidence unit 1111 and an area therein for allowing exiting of light that has entered the light-guiding component 100 from a corresponding second light incidence unit 1121 may overlap at least partially or may not overlap each other in the thickness direction Y.

In the illustrated embodiment, the light-guiding component 100 further comprises a transition section 130; the transition section 130, for example, is located between the light introduction section 110 and the light-guiding section 120, so that the light entering through the light introduction section 110 is guided into the light-guiding section 120 through the transition section 130. As shown in the figure, the first light incidence portion 111 and the second light incidence portion 112 extend from the transition section 130 away from the light-guiding section 120, for example, extending towards the corresponding light source, the first light incidence portion 111 and the second light incidence portion 112 extending in different directions. In addition, an extending distance of the first light incidence portion 111 and that of the second light incidence portion 112 may be the same or different, which may be set according to a light incidence requirement. In the example illustrated in FIGS. 1-4B, the extending direction of the first light incidence portion 111 and that of the light-guiding section 120 are substantially the same, both in the Z direction, and the extending direction of the second light incidence portion 112 is substantially perpendicular to the Z direction; in the example illustrated in FIGS. 5-7B, the extending direction of the first light incidence portion and that of the second light incidence portion are opposite, and both are substantially perpendicular to the Z direction.

It will be understood that although in the present disclosure, for the convenience of description, the term "section" is used to describe various parts of the light-guiding component, this only distinguishes the various parts of the light-guiding component from certain specific functions, instead of being intended to limit the present disclosure, and it does not mean that these sections are necessarily physical interfaces that are independent or separated by physical interfaces. In some examples, the light-guiding component is an integral member, and the above-mentioned sections are integrally formed, without physical separation interfaces between them.

The transition section 130 is configured to guide the light entering from the first light incidence portion 111 and the second light incidence portion 112 towards the light-guiding section 120, so that the light from the first light incidence portion 111, after being guided by the transition section 130 to pass through the light-guiding section 120, exits from a first light exit area of the light exit surface 121, and that the light from the second light incidence portion 112, after being guided by the transition section 130 to pass through the light-guiding section 120, exits from a second light exit area of the light exit surface 121. Preferably, the first light exit area and the second light exit area overlap at least partially in the width direction X.

In some examples, the transition section is configured such that light entering from one of the two light incidence portions oriented towards different directions is directly guided into the light-guiding section by the transition section, while the light direction remains unchanged by the transition section. As shown in FIG. 4A, the light from the light source 101 and entering through the first light incidence portion 111 or its light incidence unit 1111 is guided directly through the transition section 130, passes through the light-guiding section 120, and then exits from the light exit surface 121, with its propagation direction remaining unchanged by the transition section 130; the light enters the light-guiding section 120 in the same direction as the propagation direction it followed when leaving the first light incidence portion 112 or its light incidence unit 1121.

Figure 4B:
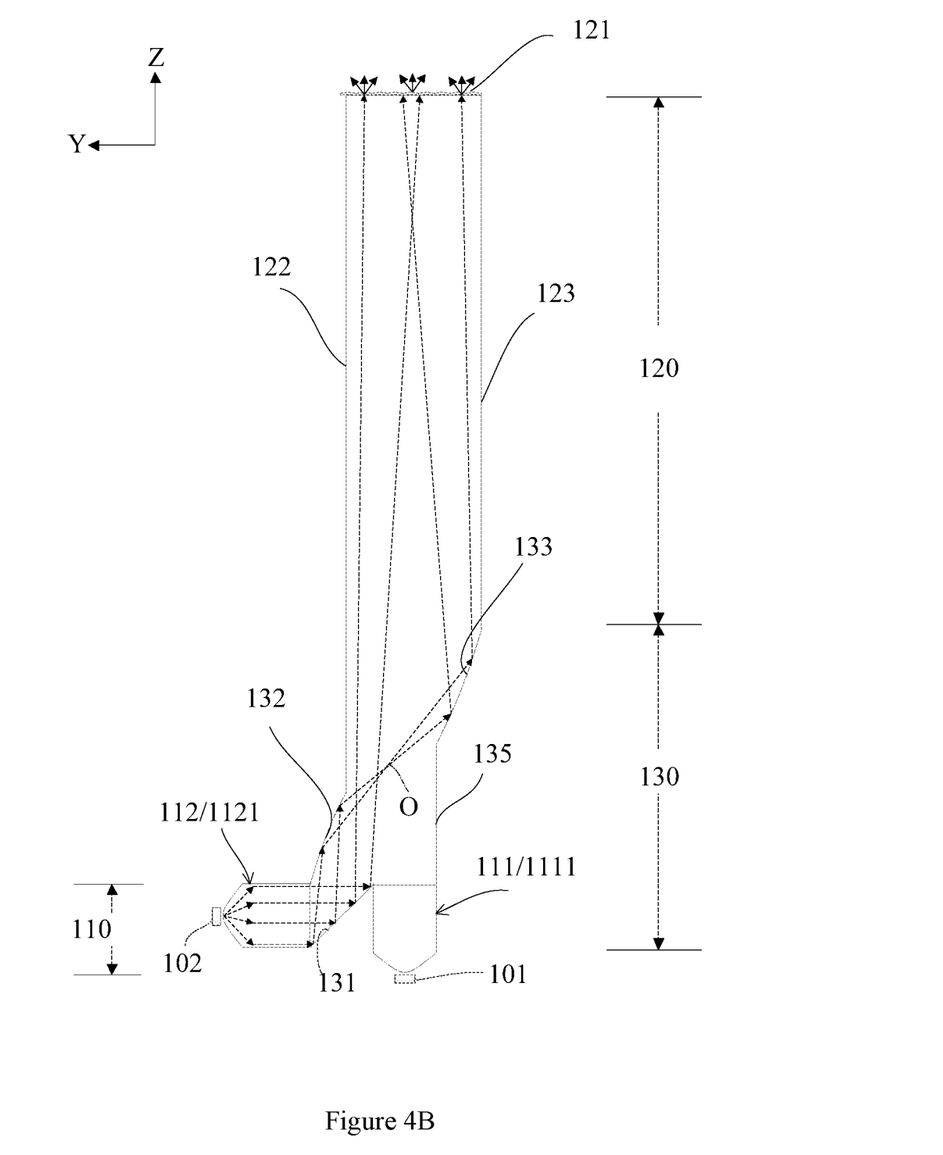
FIG. 4B is a cross-sectional view schematically showing the structure of the light-guiding component according to an embodiment of the present disclosure, in which a propagation path of the light entering from the second light incidence portion in the light-guiding component is shown.
Figure 5:
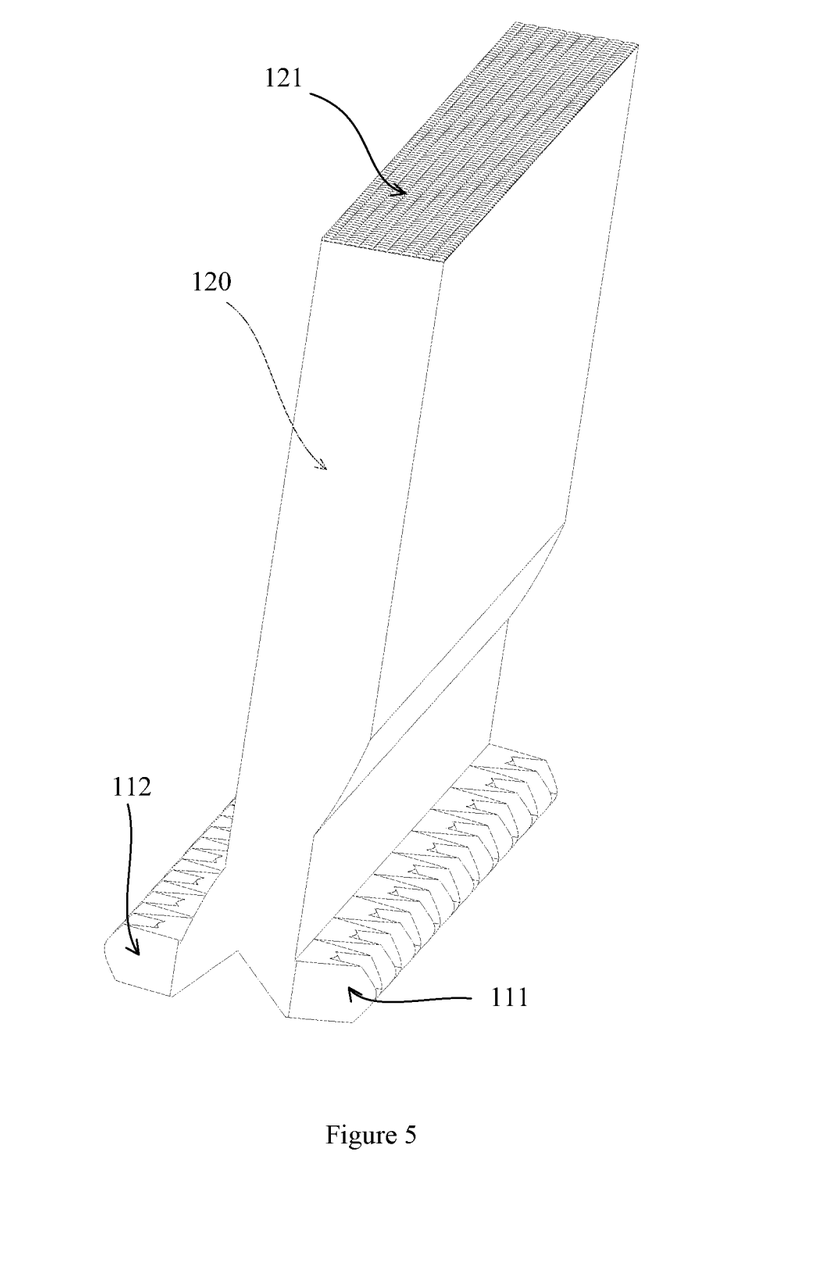
FIG. 5 is a lateral perspective view schematically showing the structure of a light-guiding component according to yet another embodiment of the present disclosure.
Figure 6:
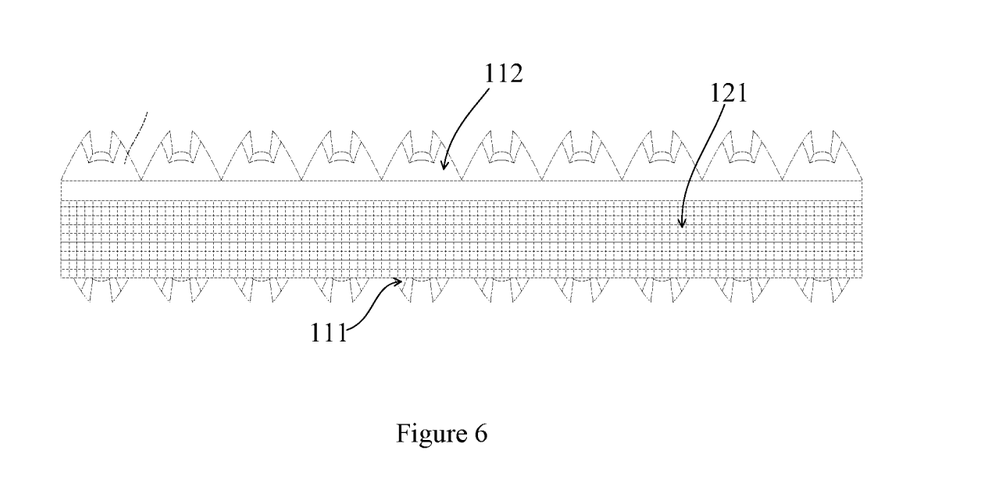
FIG. 6 is a top perspective view schematically showing the structure of a light-guiding component according to an embodiment of the present disclosure.
Figure 7A:
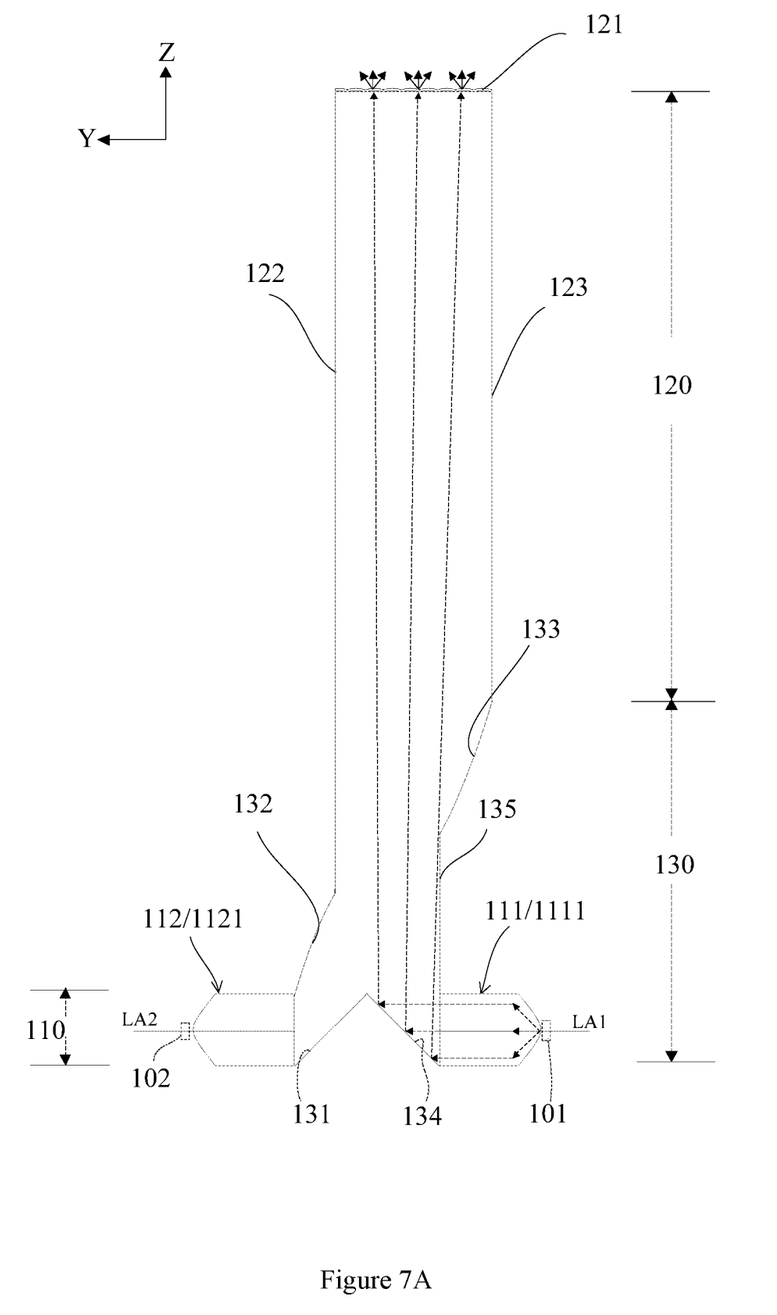
FIG. 7A is a cross-sectional view schematically showing the structure of a light-guiding component according to yet another embodiment of the present disclosure, in which a propagation path of light entering from the first light incidence portion in the light-guiding component is shown.
Figure 7B:
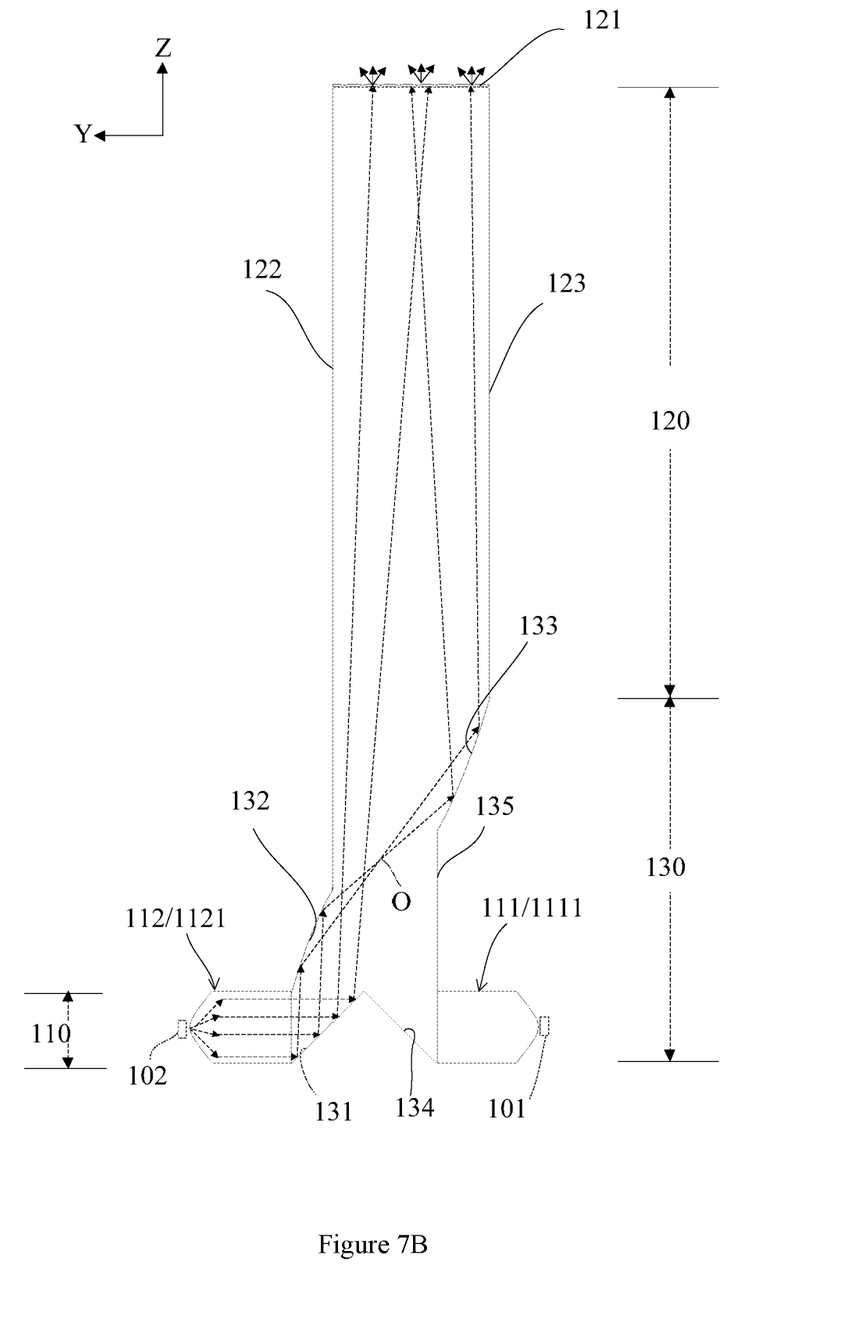
FIG. 7B is a cross-sectional view schematically showing the structure of a light-guiding component according to still another embodiment of the present disclosure, in which a propagation path of light entering from the second light incidence portion in the light-guiding component is shown.

Further or as an alternative, the transition section 130 may guide part of the incident light from at least one light incidence portion (or light incidence unit) of the first light incidence portion 111 (or its light incidence unit 1111) and the second light incidence portion 112 (or its light incidence unit 1121), so that it changes direction and enters the light-guiding section 120. As shown in FIGS. 4B and 7B, the light coming from the light source 102 and entering through the first light incidence portion 112 or its light incidence unit 1121 is guided by the transition section 130 to change its propagation direction, and enters the light-guiding section 120 in a direction different from the propagation direction it followed when leaving the first light incidence portion 112 or its light-incident unit 1121 and exits from the light-exit surface 121. In another embodiment, as shown in FIG. 7A, the light coming from the light source 102 and entering through the first light incidence portion 112 or its light incidence unit 1121 also changes its propagation direction by the transition section 130, and enters the light-guiding section 120 in a direction different from the propagation direction it followed when leaving the first light incidence portion 112 or its light-incident unit 1121 and exits from the light-exit surface 121.

In the exemplary embodiment illustrated in the present disclosure, as shown in FIGS. 4A, 4B, 7A, and 7B, the transition section 130 may comprise a first reflection surface 131, a second reflection surface 132, and a third reflection surface 133. The first reflection surface 131 is positioned adjacent to the corresponding second light incidence portion 112 or its light incidence unit 1121 to reflect incident light that has entered from the light incidence portion into the transition section 130. The second reflection surface 132 is positioned or oriented to receive and reflect at least a part of the light reflected by the first reflection surface 131. The third reflection surface 133 receives reflected light from the second reflection surface 132 and then reflects it into the light-guiding section 120 so that the reflected light is propagated in the light-guiding section 120 to exit from the light exit surface 121.

In addition, in some examples, as shown in FIGS. 4B and 7B, the first reflection surface 131 is further oriented to directly reflect a part of the incident light from the corresponding second light incidence portion 112 or its light incidence unit 1121 into the light-guiding section 120; without the need for being reflected again by the second reflection surface 132 or the third reflection surface 133, the light finally exits from the light exit surface 121.

In an exemplary embodiment, the first reflection surface 131 may be an inclined surface or a curved surface, and at least one of the second reflection surface 132 and the third reflection surface 133 may comprise a parabolic surface or a conical surface. Preferably, the second reflection surface 132 and the third reflection surface 133 are both parabolic surfaces, and the two parabolic surfaces have the same focus 0. In a preferred example, part or all of the reflected light from the second reflection surface 132 reaches the third reflection surface 133 through the focus 0 or its vicinity. As shown in the figure, the second reflection surface 132 and the third reflection surface 133 are located on opposite sides of the transition section 130 and are located at different positions in the Z direction; for example, the first reflection surface 131 extends from the second light incidence portion 112 to the first light incidence portion 111, the second reflection surface 132 extends from the second light incidence portion 112 to the light-guiding section 120, and the third reflection surface 133 is located on the opposite side of the second reflection surface 132 and extends to the light-guiding section 120 at a position shown in the figure that is higher than the second reflection surface 132.

Preferably, the first reflection surface 131, the second reflection surface 132, and/or the third reflection surface 133 are configured as a total reflection surface, so that the light reflected by it ultimately exits from the light exit surface 121 only, instead of exiting from the lateral surface 122 or 123.

According to the embodiments of the present disclosure, although the light-guiding component is used to guide light from light sources having different orientations or light entering in different directions, such a reflective structure of the transition section may ensure that the overall thickness of the light-guiding component, especially the thickness of the light-guiding section, is reduced. It is understandable that, in another embodiment, a reflection surface similar to the arrangement of the above-mentioned reflection surfaces may be provided for the first light incidence portion; for example, the transition section may also be provided with a reflection surface corresponding to (for example, being symmetrical to or mirroring, such as being on the opposite side 135 of the second reflection surface) the second reflection surface, and a reflection surface corresponding to (for example, being symmetrical to or mirroring, such as being on the opposite side of the third reflection surface) the third reflection surface.

In some embodiments, at least one of the second reflection surface 132 and the third reflection surface 133 may be provided with a light dispersion structure, so that the light dispersed by the light dispersion structure exits across the thickness of the light-guiding component 100 at the light exit surface 121. Similarly, the first reflection surface 131 may also be provided with a structure for dispersing or diffusing light.

In the embodiment illustrated in FIGS. 5-7B, the transition section 130 further comprises a fourth reflection surface 134, which is positioned adjacent to the corresponding first light incidence portion 111 or its light incidence unit 1111, so as to directly reflect the incident light that has entered from the light incidence portion 111 into the light-guiding section 120, which light then exits from the light exit surface 121. The fourth reflection surface 134 may extend obliquely from the first light incidence portion 111, and the first reflection surface 131 may obliquely extend from the second light incidence portion 112 to be connected to the fourth reflection surface 134, the two surfaces forming a roughly V-shaped contour.

An embodiment of the present disclosure further provides a lighting device, for example, a vehicle light. The lighting device comprises at least two groups of light sources 101, 102 and the light-guiding component as described in any of the preceding embodiments. One group of light sources 101 corresponds to the first light incidence portion 111, and the other group of light sources 102 corresponds to the second light incidence portion 112. In some examples, the colour of light emitted by the light source 101 and that by the light source 102 are different. The lighting device may comprise any type of vehicle lighting and/or signal lights, such as headlights, central high-position brake lights, indicator lights, position lights, and rear brake lights.

When the light-guiding component according to an embodiment of the present disclosure is applied to a lighting device of a vehicle, for example, light sources located in different orientations may be lit up or emit light at different times in a time-sharing manner or as needed, and light is guided by the same light-guiding component to fulfil the corresponding lighting/indicating function. For example, the colours of light emitted by the light sources 101 and 102 may be different from each other; thus, by arranging different types of light sources (for example, light sources that emit light having different colours) relative to the same light-guiding component, a variety of lighting/indicating functions may be fulfilled. Exemplarily, one light source emits yellow light and another light source emits white light; the signal giving function of an indicator light (yellow light) and the illumination function of a headlight (daytime running light) and position light (white light) may be fulfilled by the same light-guiding component, wherein when one light source emits light, the other light source is turned off accordingly, and vice versa. Certainly, by the introduction of more light sources, the above-mentioned light-guiding component may correspondingly be provided with more light introduction parts, thereby introducing more functions; alternatively, light having different colours may be arranged in pairs or groups for a combination of different light-emitting/illumination/indicating devices, for example, by the introduction of a red light source. Here, white light may be used for a position light, a low beam light, a high beam light, a fog light, a daytime running light, etc., yellow light may be used for an indicator light, a warning light, etc., and red light may be used as for a brake light, a tail light, etc. Therefore, by differently combining the above-mentioned light sources that emit light having various colours, a compact light-emitting/illuminating/indicating device with different functions may be formed. In some embodiments, at least one of the above-described light sources may emit light having two or more colours according to actual needs; for example, the light source may be an LED lamp, such as a white LED lamp, a yellow LED lamp, or a red LED lamp. In some other embodiments, the above-described light sources may emit light at the same time, and light from light sources in different orientations (for example, light having different colours, intensities, etc.) may be guided and mixed in the same light-guiding component to achieve a desired lighting effect.

An embodiment of the present invention further provides a vehicle comprising the light-guiding component or the lighting device as described in any of the preceding embodiments.

Although the present disclosure has been explained in conjunction with the drawings, the embodiments disclosed in the drawings are intended to provide an exemplary illustration of preferred embodiments of the present disclosure, and must not be interpreted as a limitation of the present disclosure. The dimensional proportions in the drawings are merely schematic, and must not be interpreted as a limitation of the present disclosure.

While some embodiments of the general idea of the present disclosure have been shown and explained above, those of ordinary skill in the art will understand that modifications may be made to these embodiments without departing from the principles or spirit of the general invention idea and that the scope of the present disclosure is defined by the claims and equivalents of.

The invention claimed is:

1. A light-guiding component, comprising:
a light introduction section, the light introduction section comprising a first light incidence portion and a second light incidence portion that face different directions, the first light incidence portion being capable of receiving incident light from a light source that corresponds to the first light incidence portion, the second light incidence portion being capable of receiving incident light from a light source that corresponds to the second light incidence portion;
a light-guiding section, the light-guiding section being provided with a light exit surface and configured to guide the light from the first light incidence portion or the second light incidence portion to be propagated therein and then exit from the light exit surface; and
a transition section located between the light introduction section and the light-guiding section,
wherein the transition section comprises:
  a first reflection surface positioned adjacent to a corresponding light incidence portion and configured to reflect corresponding incident light entering from the corresponding light incidence portion,
  a second reflection surface configured to receive and reflect a part of the corresponding incident light reflected by the first reflection surface, and
  a third reflection surface configured to receive reflected light from the second reflection surface and then reflect the reflected light into the light-guiding section, so that the reflected light is propagated in the light-guiding section to exit from the light exit surface.

2. The light-guiding component according to claim 1, wherein:
the first light incidence portion and the second light incidence portion are configured to receive light that enters in different directions, and
an included angle θ between an optical axis, LA1 of the first light incidence portion and an optical axis, LA2 of the second light incidence portion is within a range of being greater than 0 degrees and smaller than or equal to 180 degrees.

3. The light-guiding component as claimed in claim 1, wherein:
the first light incidence portion comprises a plurality of first light incidence units, the second light incidence portion comprises a plurality of second light incidence units,
the plurality of first light incidence units and the plurality of second light incidence units are respectively arranged along a width direction of the light-guiding component, and the first light incidence portion and the second light incidence portion are not collinear in the width direction.

4. The light-guiding component according to claim 3, wherein at least one of the first light incidence unit and the second light incidence unit comprises a collimator to collimate received light into parallel light.

5. The light-guiding component according to claim 1, wherein the light-guiding component is configured such that the light exit areas respectively corresponding to the first light incidence portion and the second light incidence portion at the light exit surface at least partially overlap in the width direction of the light-guiding component.

6. The light-guiding component according to claim 5, wherein:
the transition section is configured to guide light that has entered from the first light incidence portion and the second light incidence portion towards the interior of the light-guiding section, so that light from the first light incidence portion exits from a first light exit area of the light exit surface after being guided by the transition section, and light from the second light incidence portion exits from a second light exit area of the light exit surface after being guided by the transition section, the first light exit area and the second light exit area at least partially overlapping in the width direction.

7. The light-guiding component according to claim 6, wherein the transition section guides part of the incident light from at least one of the first light incidence portion and the second light incidence portion to change its direction.

8. The light-guiding component according to claim 1, wherein the first reflection surface is oriented to reflect a part of incident light from a corresponding light incidence portion to the second reflection surface, and reflect another part of the incident light directly into the light-guiding section so that it exits from the light exit surface.

9. The light-guiding component according to claim 1, wherein at least one of the second reflection surface and the third reflection surface comprises a parabolic surface or a conical surface.

10. The light-guiding component according to claim 9, wherein the second reflection surface and the third reflection surface are both parabolic surfaces, and the two parabolic surfaces have a same focus.

11. The light-guiding component according to claim 1, wherein the second reflection surface and the third reflection surface are located on opposite sides of the transition section.

12. The light-guiding component according to claim 1, wherein at least one of the second reflection surface and the third reflection surface is provided with a light dispersion structure, so that light dispersed by the light dispersion structure exits across the thickness of the light-guiding component at the light exit surface.

13. The light-guiding component according to claim 7, wherein the transition section comprises:
a fourth reflection surface, the fourth reflection surface being positioned adjacent to a corresponding light incidence portion to directly reflect incident light entering from the light incidence portion into the light-guiding section so that it exits from the light exit surface.

14. The light-guiding component according to claim 1, wherein the light exit surface is provided with a plurality of scattering structures, the plurality of scattering structures being configured to uniformly scatter outwards the light that has exited from the light-guiding section.

15. A lighting device, comprising:
at least two groups of light sources; and
the light-guiding component according to claim 1, wherein one group of light sources corresponds to the first light incidence portion, and the other group of light sources corresponds to the second light incidence portion.

16. The lighting device according to claim 15, wherein the colour of light emitted by the one group of light sources and that by the other group of light sources are different.

17. A vehicle, comprising the lighting device according to claim 15.

18. The light-guiding component according to claim 2, wherein the light-guiding component is configured such that the light exit areas respectively corresponding to the first light incidence portion and the second light incidence portion at the light exit surface at least partially overlap in the width direction of the light-guiding component.

19. The light-guiding component according to claim 1, wherein the third reflection surface is in direct contact with a side surface of the light-guiding section.

* * * * *